US012558693B2

(12) United States Patent
de Assis Nogueira Junior

(10) Patent No.: US 12,558,693 B2
(45) Date of Patent: Feb. 24, 2026

(54) SCREW FLIGHT SYSTEM, REPLACEMENT KIT, A VERTICAL GRINDING MILL, AND METHOD OF MOUNTING THE SAME

(71) Applicant: Metso Finland Oy, Espoo (FI)

(72) Inventor: Francisco de Assis Nogueira Junior, Vila Haro Sorocaba-SP (BR)

(73) Assignee: Metso Finland Oy, Espoo (FI)

(*) Notice: Subject to any disclaimer, the term of this patent is extended or adjusted under 35 U.S.C. 154(b) by 167 days.

(21) Appl. No.: 18/036,502

(22) PCT Filed: Dec. 9, 2021

(86) PCT No.: PCT/EP2021/084949

§ 371 (c)(1),
(2) Date: May 11, 2023

(87) PCT Pub. No.: WO2022/128725

PCT Pub. Date: Jun. 23, 2022

(65) Prior Publication Data

US 2024/0009675 A1 Jan. 11, 2024

(30) Foreign Application Priority Data

Dec. 17, 2020 (SE) .................................... 2051482-4

(51) Int. Cl.
*B02C 17/16* (2006.01)

(52) U.S. Cl.
CPC ........ *B02C 17/163* (2013.01); *B02C 2210/02* (2013.01)

(58) Field of Classification Search
CPC .......................... B02C 17/163; B02C 2210/02
See application file for complete search history.

(56) References Cited

U.S. PATENT DOCUMENTS 4,242,002 A 12/1980 Kawabata
4,660,776 A 4/1987 Ikebuchi et al.
2014/0097281 A1 4/2014 Seiler et al.
(Continued)

FOREIGN PATENT DOCUMENTS

AU 2014201893 A1 10/2014
AU 2014210606 A1 4/2015
(Continued)

OTHER PUBLICATIONS

Translation of SE-1150805.*
(Continued)

*Primary Examiner* — Bobby Yeonjin Kim
(74) *Attorney, Agent, or Firm* — Andrus Intellectual Property Law, LLP

(57) ABSTRACT

A screw flight system including a helical screw flight, and at least one wear lining element is disclosed. The screw flight system further includes a guiding system including at least one guide pin configured to be arranged on one of the helical screw flight and the at least one wear lining element, and at least one guide hole arranged on the other of the helical screw flight and the at least one wear lining element, wherein the at least one guide hole being configured to receive the at least one guide pin. A vertical grinding mill including the screw flight system, a replacement kit of wear lining elements, and a method for mounting thereof are also disclosed.

8 Claims, 16 Drawing Sheets

(56) References Cited

U.S. PATENT DOCUMENTS

| | | | | |
|---|---|---|---|---|
| 2015/0033529 | A1 | 2/2015 | Allen | |
| 2016/0144373 | A1* | 5/2016 | Haas | B02C 17/163<br>366/343 |

FOREIGN PATENT DOCUMENTS

| | | | | | |
|---|---|---|---|---|---|
| CL | 59101 | | | 11/2017 | |
| CL | 202301497 | | | 5/2023 | |
| CN | 2915923 | Y | * | 6/2007 | |
| CN | 102985184 | A | | 3/2013 | |
| CN | 205308463 | U | | 6/2016 | |
| CN | 106076513 | A | | 11/2016 | |
| CN | 208275513 | U | | 12/2018 | |
| CN | 109876903 | A | | 6/2019 | |
| JP | H0522040 | U | | 3/1993 | |
| JP | 2018058052 | A | | 4/2018 | |
| SE | 1150805 | A1 | * | 3/2013 | G01B 11/272 |
| WO | 0032503 | | | 6/2000 | |
| WO | WO-2011130782 | A1 | * | 10/2011 | B02C 17/22 |
| WO | 2016079574 | A1 | | 5/2016 | |
| WO | 2022128725 | A1 | | 6/2022 | |

OTHER PUBLICATIONS

Translation of CN-2915923.*

Examiner's Report and Search Report for Chilean Application No. 202301496, dated Oct. 16, 2024.

Office Action for Chinese Patent Application No. 202111543294.9, issued Oct. 18, 2024.

International Search Report and Written Opinion for PCT/EP2021/084949, mailed Apr. 8, 2022.

Office Action for Swedish Application No. 2051482-4, dated May 11, 2021.

* cited by examiner

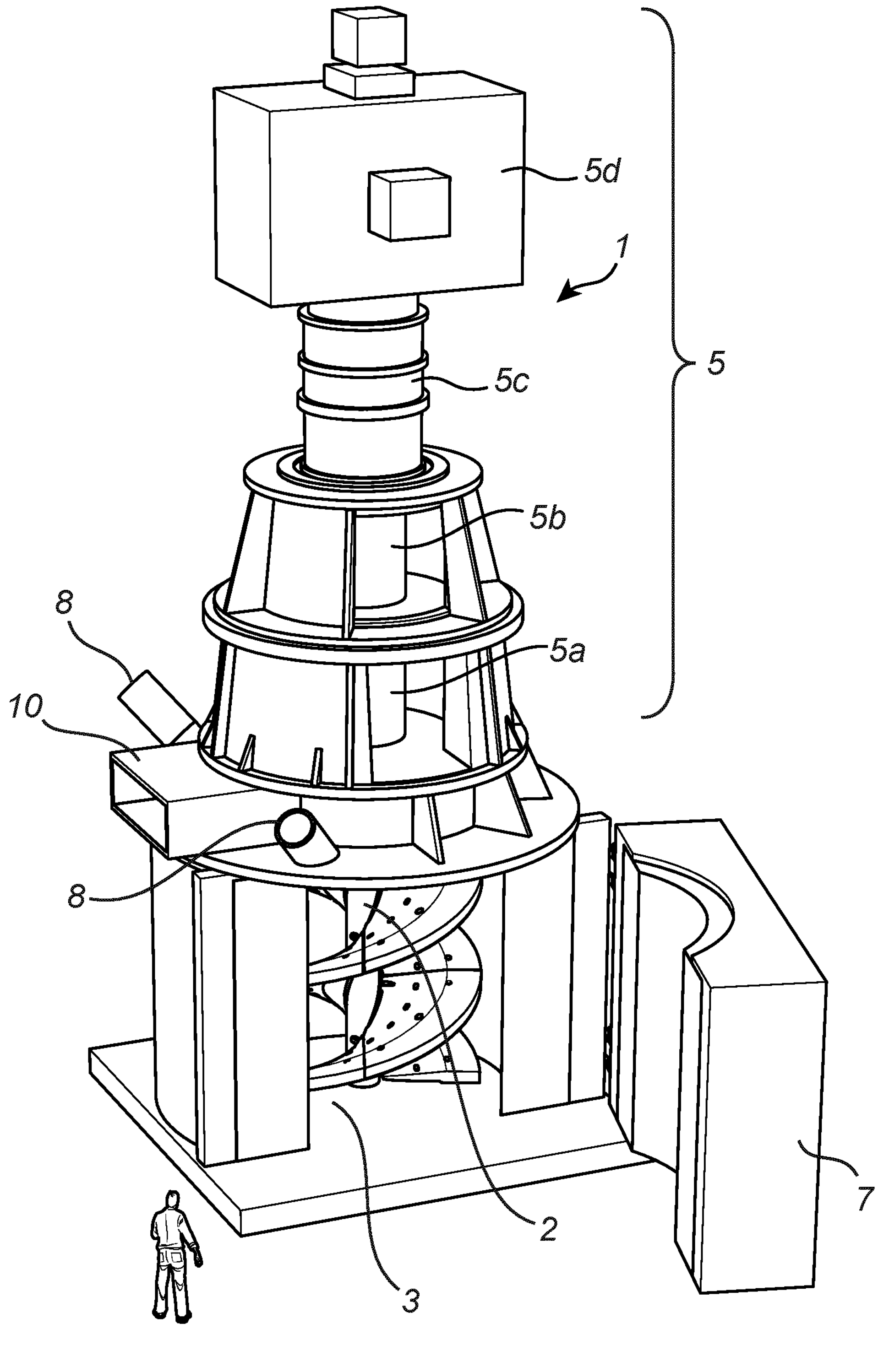
(Prior art) Fig. 1a

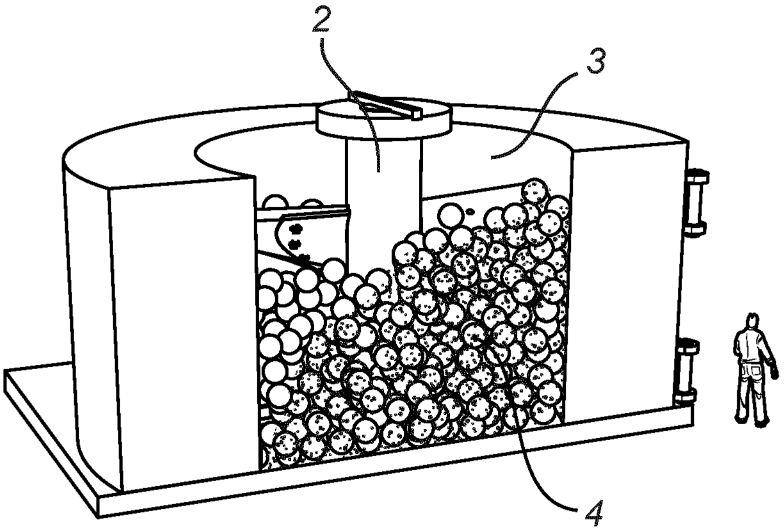
(Prior art) Fig. 1b

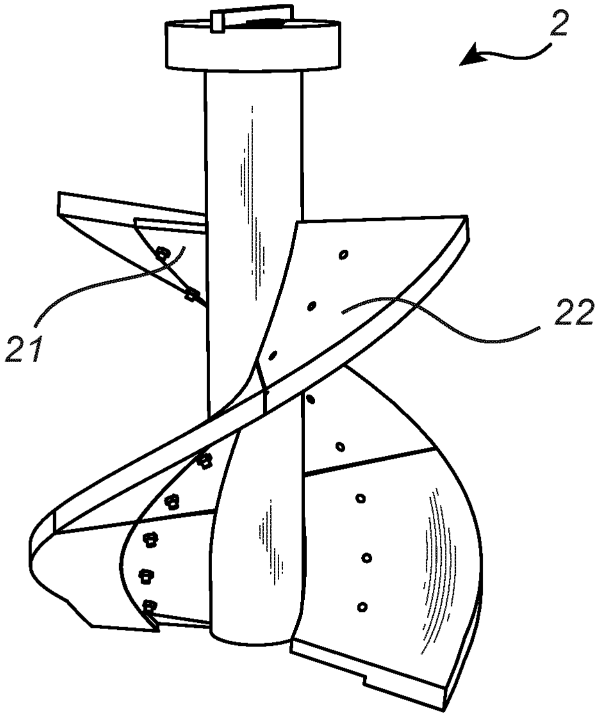
(Prior art) *Fig. 2a*
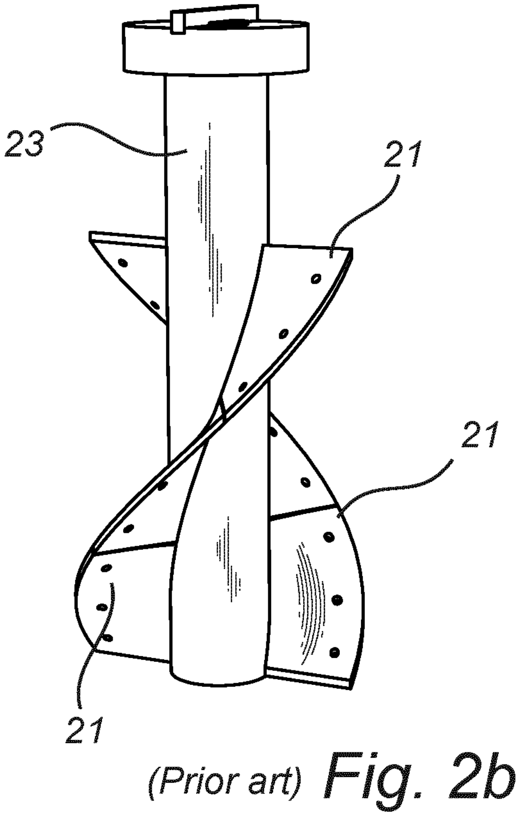
(Prior art) *Fig. 2b*

SCREW FLIGHT SYSTEM, REPLACEMENT KIT, A VERTICAL GRINDING MILL, AND METHOD OF MOUNTING THE SAME

CROSS-REFERENCE TO RELATED APPLICATIONS

This application is the U.S. national stage application of International Application PCT/EP2021/084949, filed Dec. 9, 2021, which international application was published on Jun. 23, 2022, as International Publication WO 2022/128725 A1 in the English language. The International Application claims priority Swedish Patent Application No. 2051482-4 filed Dec. 17, 2020.

FIELD OF THE DISCLOSURE

The present disclosure relates to agitator means for vertical grinding mills. In particular, the present disclosure relates to a screw flight system comprising a helical screw flight and at least one wear lining element. Also disclosed is a vertical grinding mill comprising the screw flight system, a replacement kit of wear lining elements for the screw flight system, and a method of mounting the same.

BACKGROUND

Vertical grinding mills are known, e.g., from U.S. Pat. No. 4,660,776 and from the brochure "VERTIMILL™—Fine and ultrafine wet grinding". A vertical grinding mill has a chamber in which an agitator is arranged. Grinding media, which may be made of e.g. steel or ceramics and which may have different shapes, such as balls or natural pebbles, is provided in the chamber. Water, the material to be ground, and optionally additives are fed into the chamber. By rotating the agitator, the charge is agitated, such that the grinding media grinds the material to be ground by abrasion and attrition. The two references mentioned above disclose vertically arranged stirred mills. However, the same general principle is used in stirred mills with e.g. tilted arrangement.

The chamber retains the grinding media and, in case of a vertically arranged mill, the chamber also supports the drive components including the agitator.

The agitator which rotates and imparts motion to the grinding media consists, in the VERTIMILL™, of an inner welded screw flight system that supports a number of outer wear liner elements, which are bolted onto the welded screw flight system. These wear liner elements need to be exchanged when worn out. The wear liner elements are large and heavy, and the access to perform the exchange is limited. Altogether, this may make it difficult to position and fasten the wear liner element to the screw flight in an efficient way.

SUMMARY

An object of the disclosure is to provide a screw flight system which decreases the exchange time.

According to a first aspect of the disclosure, this and other objects are achieved, in full or at least in part, by a screw flight system comprising a helical screw flight, and at least one wear lining element. According to this first aspect, the screw flight system further comprises a guiding system. This guiding system comprises at least one guide pin configured to be arranged on one of the helical screw flight and the at least one wear lining element, and at least one guide hole arranged on the other of the helical screw flight and the at least one wear lining element, wherein the at least one guide hole being configured to receive the at least one guide pin.

By providing a guiding system to the screw flight system, the time-consuming exchange time may be decreased considerably, and the wear lining element is easier to hold in position when aligning the wear lining element to the screw flight and fastening thereof.

According to an embodiment of the screw flight system, the helical screw flight and the at least one wear lining element may have a set of through-going bolt holes, which holes are arranged along a first line, and wherein the at least one guide pin and the at least one guide hole are radially displaced in view of the first line.

By arranging the guide hole and guide pin radially displaced in view of the through-going bolt holes, the fastening with bolted joints may be completed without having to remove the at least one guide pin before the fastening is completed.

According to another embodiment of the screw flight system, the guiding system may comprise at least two guide pins and at least two guide holes and that the at least two guide pins and the at least two guide holes are arranged on opposite sides of the first line. Further, the at least two guide pins and the at least two guide holes may be displaced along the helical extension of the helical screw flight and the at least one wear lining element. By arranging the two guide pins and the at least two guide holes on opposite sides of the first line, the wear lining element is secured and hold in place even better than only using one guide pin and guide hole during the fastening of the wear lining element to the helical screw flight, and by having the at least two guide pins and the at least two guide holes displaced along the helical extension, the weight distribution on the at least two guide pins, when positioned in the corresponding guide holes, are more even.

According to one embodiment of the screw flight system, the at least one guide pin may be arranged to be removable on one of the helical screw flight and the wear lining elements.

According to one embodiment of the screw flight system, the at least one guide pin may be configured to be arranged on the at least one wear lining element, and the at least one guide hole is arranged on the helical screw flight. Further, the at least one wear lining element may comprise at least one insert, and wherein the at least one guide pin is arranged to engage the at least one insert by threading.

In one embodiment of the screw flight system, the at least one insert may be arranged in a through-going channel, and wherein the at least one insert further comprises a bore arranged for receiving and engaging a lifting lug or a protecting plug. Further, the at least one wear lining element, on a surface configured to face away from the helical screw flight, may comprise a protrusion at least partly surrounding the bore, and such protrusion may at least partly surrounding the bore as seen along a leading edge of the at least one wear lining element. By arranging one insert like this in a through-going hole and protecting the bore therein with a protection plug during operation, this bore may be used for receiving and engaging a lifting lug upon removal of the wear lining element when worn out, and the positioning of this bore is estimated to correspond to the center of gravity when the wear lining element is worn out. Thus, using this bore for a lifting lug ensures a controlled and stable removal of the worn wear lining element when being exchanged with a new wear lining element.

According to a second aspect of the disclosure, this and other objects are also achieved, in full or at least in part, by a vertical grinding mill comprising the screw flight system according to any embodiment disclosed above, or combination of the features as disclosed above.

Similarly, and correspondingly to the screw flight system, the vertical grinding mill with the screw flight system of the present disclosure will provide substantially the same advantages over prior art solutions.

According to a third aspect of the disclosure, this and other objects are also achieved, in full or at least in part, by a replacement kit of wear lining elements for a screw flight system in a vertical grinding mill. According to this third aspect, the replacement kit comprises a wear lining element and at least two guide pins configured to be arranged on the wear lining element.

According to one embodiment of the replacement kit, the wear lining element may have a set of through-going bolt holes, which are arranged along a first line, and the at least two guide pins may be configured to be arranged radially displaced on opposite sides of the first line.

According to one embodiment of the replacement kit, the at least two guide pins are displaced along the helical extension of the wear lining element.

According to another embodiment of the replacement kit, the wear lining element may comprise at least two inserts, and the at least two guide pins are arranged to engage the at least two inserts by threading.

According to a further embodiment of the replacement kit, the at least one insert may be arranged in a through-going channel, and the at least one insert may further comprise a bore arranged for receiving and engaging a lifting lug or a protecting plug. Further, the wear lining element may comprise a protrusion that at least partly surrounds the bore as seen along a leading edge of the wear lining element.

Similarly, and correspondingly to the screw flight system, the replacement kit of the present disclosure will provide substantially the same advantages over prior art solutions.

According to a fourth aspect of the disclosure, this and other objects are also achieved, in full or at least in part, by a method of mounting a screw flight system. According to the disclosure of this fourth aspect, the method comprises providing a helical screw flight, and at least one wear lining element, arranging at least one guide pin on the at least one wear lining element, lifting the at least one wear lining element and aligning the at least one guide pin with a complementary at least one guide hole arranged in the helical screw flight, and lowering the at least one wear lining element onto the helical screw flight.

According to one embodiment of this method, the method may further comprise fastening the at least one wear lining element to the helical screw flight by bolted joints.

Similarly, and correspondingly to the screw flight system, the method of mounting a screw flight system of the present disclosure will provide substantially the same advantages over prior art solutions.

Other objectives, features and advantages of the present disclosure will appear from the following detailed disclosure, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The disclosure will be described in more detail with reference to the appended schematic drawings, which show an example of a presently preferred embodiment of the disclosure.

FIG. 1*a* is a perspective view of a typical vertical grinding mill according to prior art.

FIG. 1*b* is an inner view of a grinding chamber during grinding according to prior art.

FIG. 2*a* is a perspective view of one agitator means according to prior art, which agitator means comprises a helical screw flight with wear lining elements arranged thereon.

FIG. 2*b* is a perspective view of the helical screw flight of FIG. 2*a*, but without the wear lining elements.

DETAILED DESCRIPTION

Figure 3A:
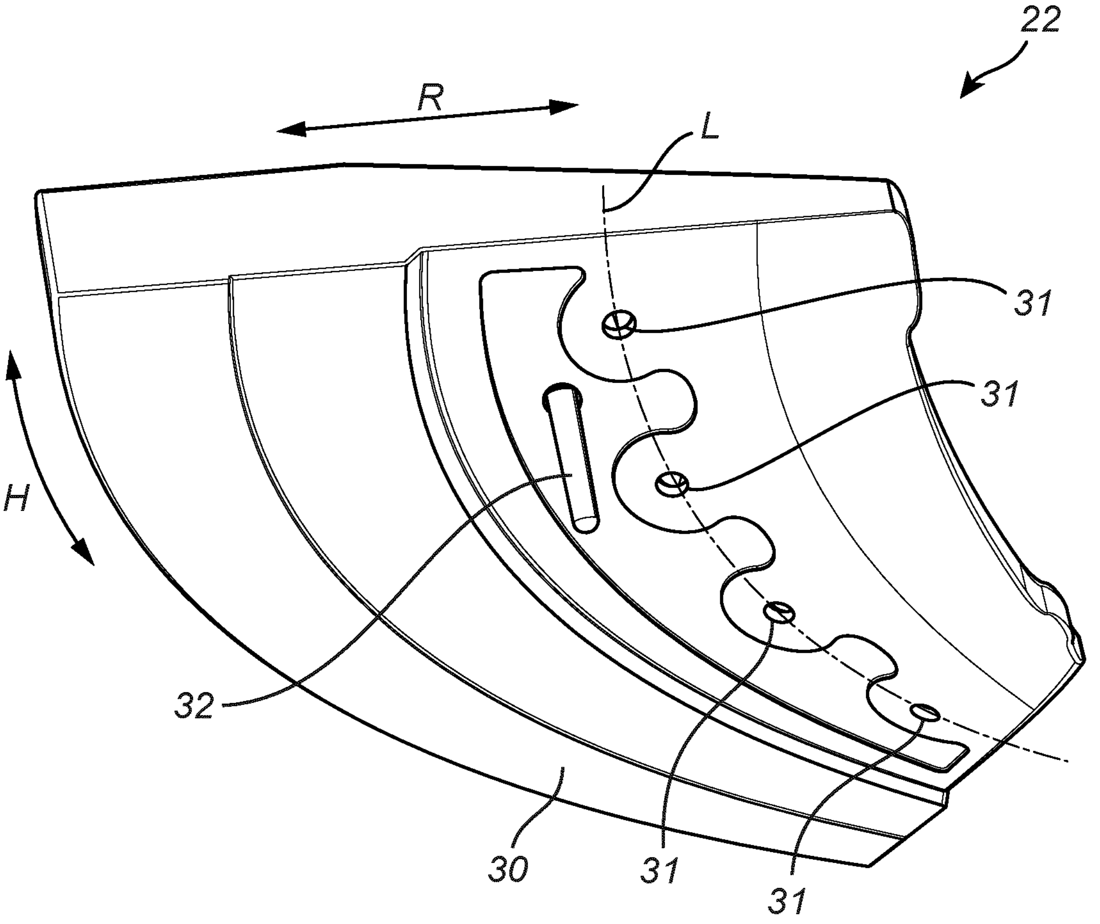
FIG. 3*a* is a perspective view of a wear lining element according to one embodiment of the disclosure.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

FIG. 1*a* shows a vertical grinding mill 1 according to prior art. The stirred mill comprises an agitator 2 in form of a screw flight system arranged in a grinding chamber 3. As shown in FIG. 1*b*, the chamber 3 is filled with grinding media 4, which may be of e.g. steel or ceramics and which may have different shapes, such as balls or natural pebbles. Slurry of water, material to be ground, and optionally additives are fed to an opening 8 at the top of the chamber 3 and the agitator 2 is rotated, thereby agitating and imparting motion to the grinding media 4, which grinds the material to be ground within the chamber 3. The agitator 2, the screw flight system, comprises a central shaft with a helical screw flight with wear lining elements arranged thereon. The helical screw flight with its wear elements provides an uprising flow along the wear elements and shaft during agitation, and a classification of particles are provided in the upper portion of the chamber 3, when particles have been grinded small enough these particles rise towards the upper portion of the chamber 3 and are removed via an overflow launder 10, while the larger, heavier particles are drawn by gravity in a downward flow between an outer periphery of the wear lining elements of the agitator 2 and an outer wall of the chamber 3, and then drawn into the uprising flow along the wear elements and shaft of the agitator 2 to be further ground.

As shown in FIG. 1*a* and FIG. 1*b*, the chamber 3 retains the grinding media 4 and also supports the drive components 5, such as driver shaft 5*a*, thrust bearing 5*b*, gear reducer 5*c* and motor 5*d*. The grinding chamber 3 and the agitator 2 is accessible for maintenance through access door 7.

FIG. 2*a* shows an agitator 2 according to prior art, which comprises an inner welded helical screw flight 21 that is supported by a shaft 23. The helical screw flight 21 supports a number of wear lining elements 22, which are bolted onto the helical screw flight 21.

FIG. 2*a* shows the helical screw flight 21 welded to the shaft 23, but without the wear lining elements 22.

Figure 3B:
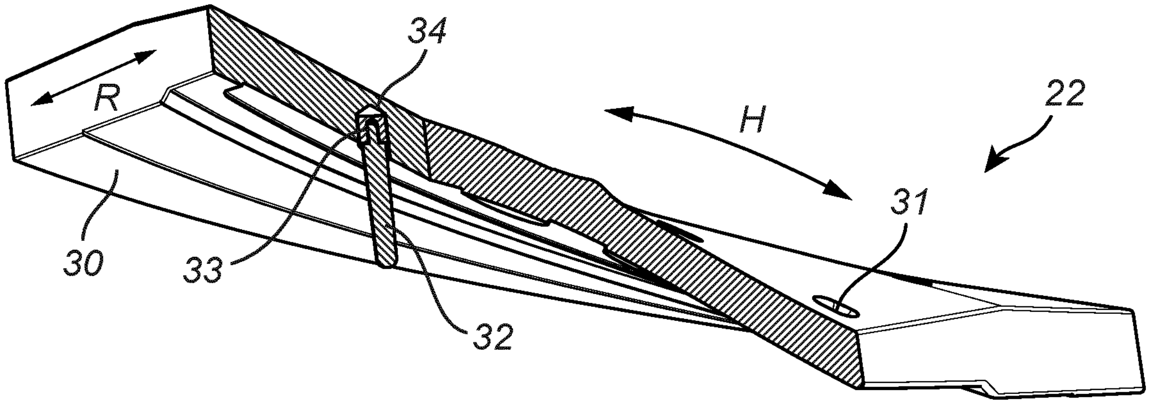
FIG. 3*b* is a cross-sectional view of the wear lining element in FIG. 3*a*.

FIGS. 3*a-d* show a screw flight system according to one embodiment of the disclosure. In FIG. 3*a* a first surface 30 of a wear lining element 22 is shown. The wear lining element 22 has a radial extension R, and a helical extension H. A set of through-going bolt holes 31 are arranged along a first line L in the wear lining element along the helical extension H of the wear lining element 22. Further a guide pin 32 is arranged on the first surface 30 of the wear lining element 22. As shown in FIG. 3*b*, an insert 33 is arranged in a recess 34 on the first side 30 of the wear lining element 22 as shown in FIGS. 3*a-b*, and the guide pin 32 is engaging the insert by threading. The guide pin is arranged radially displaced in relation to the through-going bolt holes 31.

Figure 3C:
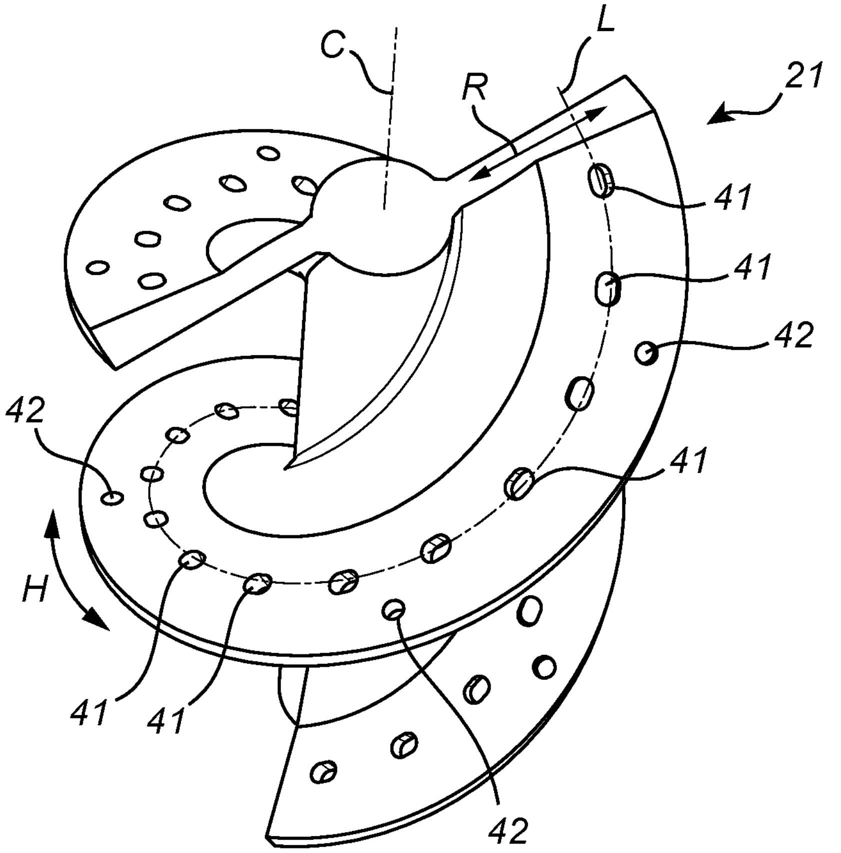
FIG. 3*c* is a perspective view of a part of a helical screw flight according to one embodiment of the disclosure.

In FIG. 3*c* a part of a helical screw flight 21 is shown. The helical screw flight 21 also has a radial extension R and a helical extension H, and a set of through-going bolt holes 41 arranged along a first line L in the helical extension H of the helical screw flight 21, which first line L has a uniform radial distance from a centre axle C of the helical screw flight 21. The helical screw flight 21 further has guide holes 42 arranged radially displaced in relation to the set of through-going bolt holes 41 at predetermined distances along the helical extension H of the helical screw flight 21, which distances coincide with the positioning of the guide pins 32 on the wear lining elements 22 and the helical extension H of the wear lining elements 22.

Figure 3D:
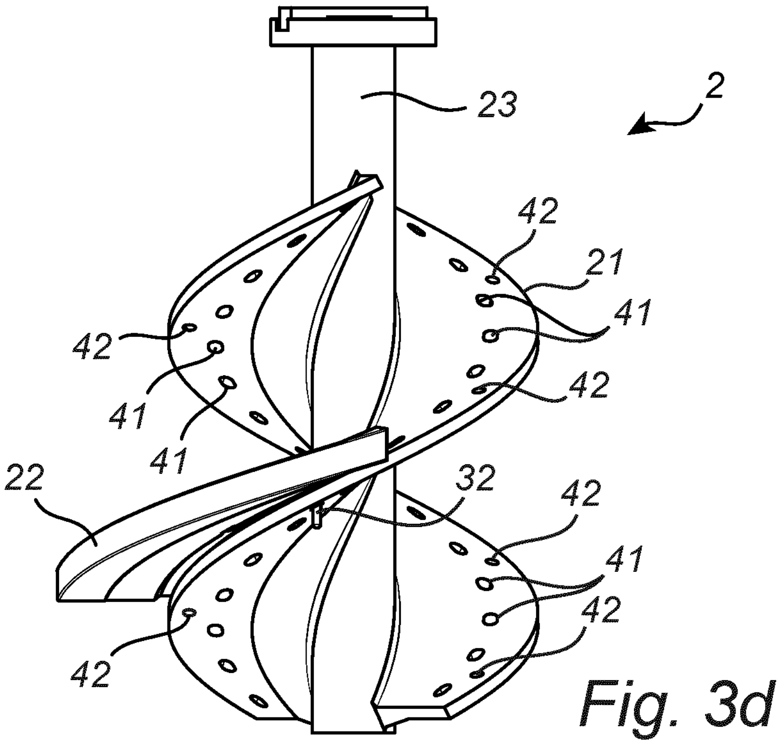
FIG. 3*d* is a perspective view of a screw flight system in which the wear lining element of FIGS. 3*a* and *b* is mounted to the helical screw flight of FIG. 3*c*.

In FIG. 3*d* the wear lining element 22 has been arranged on the helical screw flight by lifting the wear lining element 22 and aligning the guide pin 32 with a complementary guide hole 42 arranged in the helical screw flight and lowering the wear lining element 22 onto the helical screw flight 21. After having the wear lining element positioned in place, the wear lining element 22 is fastened to the helical screw flight 21 by bolted joints (not shown in FIG. 3*d*) arranged in the set of through-going bolt holes 31, 41 of the wear lining element 22 and the helical screw flight 21, which through-going bolt holes 31, 41 are aligned when guide pin 32 is received within the guide hole 42.

Figure 4A:
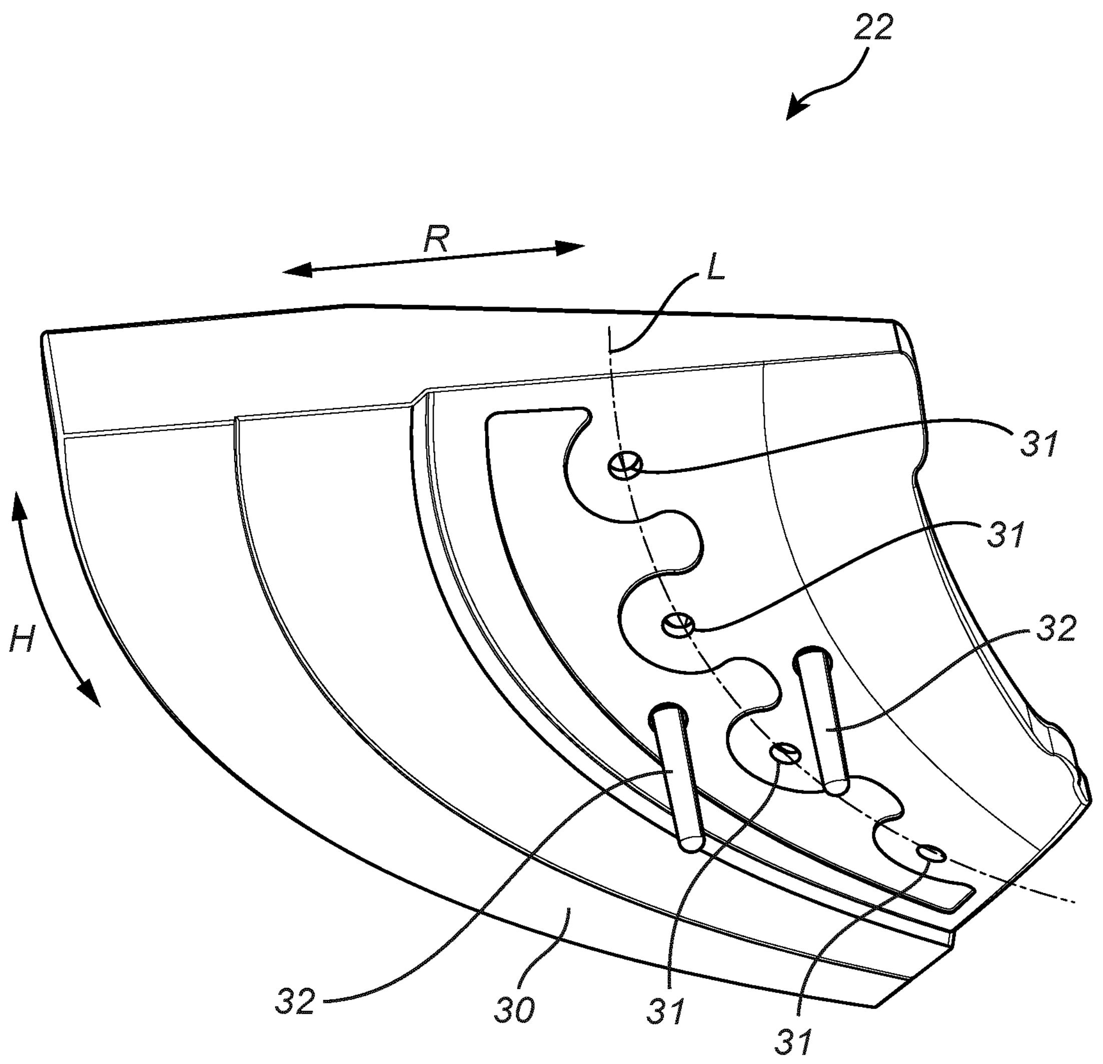
FIG. 4*a* is a perspective view of a wear lining element according to another embodiment of the disclosure.
Figure 4B:
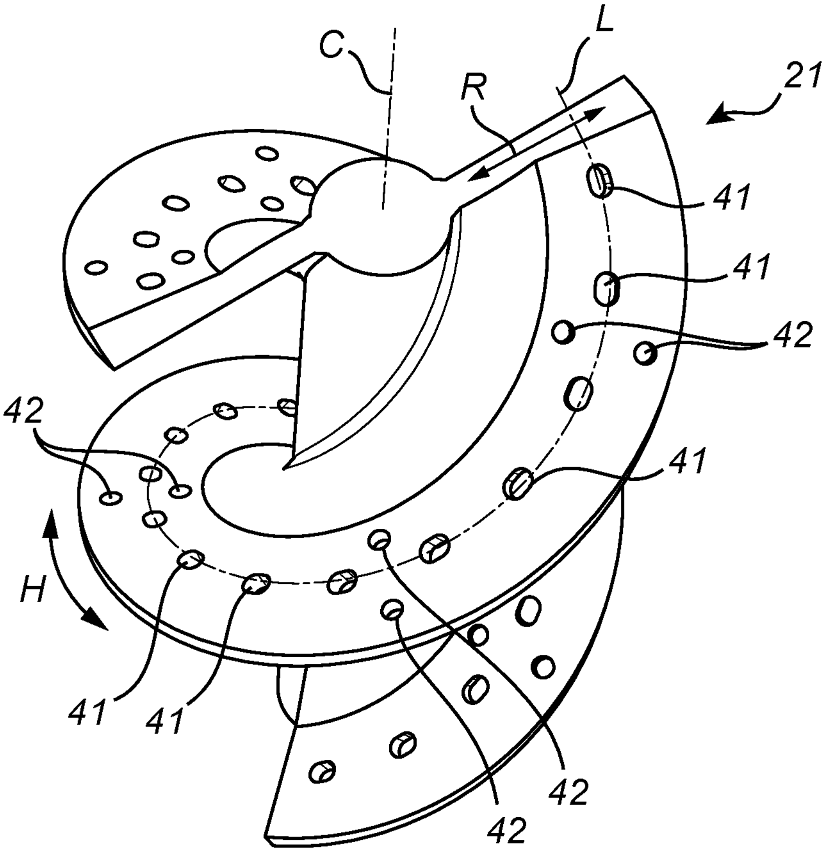
FIG. 4*b* is a perspective view of a helical screw flight according to another embodiment of the disclosure.
Figure 4C:
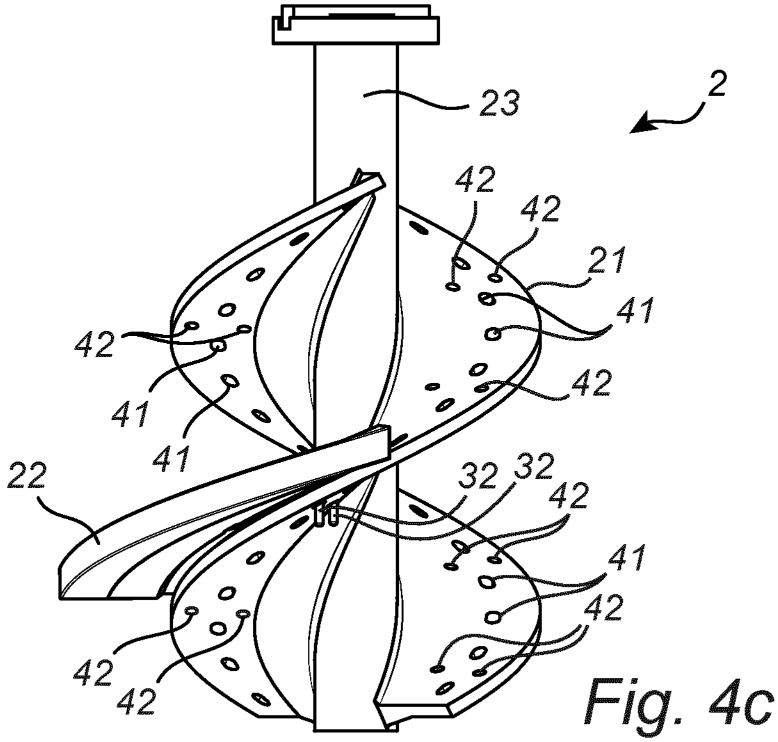
FIG. 4*c* is a perspective view of a screw flight system in which the wear lining element of FIG. 4*a* is mounted to the helical screw flight of FIG. 4*b*.

FIGS. 4*a-c* show a screw flight system according to another embodiment of the disclosure. In this embodiment, two guide pins 32 are arranged on each wear lining element 22. As seen in FIG. 4*a*, the guide pins 32 are arranged radially displaced in view of the set of through-going bolt holes along the first line L, and in a radial extension on opposite sides of the first line L. As seen in FIG. 4*b*, the helical screw flight 21 has guide holes 42 radially displaced in view of the set of through-going bolt holes 41 with a set of two guide holes 42 in a radial extension on opposite sides of the first line L, and such sets of guide holes 42 arranged at predetermined distances along the helical extension H of the helical screw flight 21, which distances coincide with the positioning of the two guide pins 32 on the wear lining elements 22 and the helical extension H of the wear lining elements 22. In FIG. 4*c* the wear lining element 22 has been arranged on the helical screw flight by lifting the wear lining element 22 and aligning the guide pins 32 with a complementary guide holes 42 arranged in the helical screw flight and lowering the wear lining element 22 onto the helical screw flight 21. After having the wear lining element positioned in place, the wear lining element 22 is fastened to the helical screw flight 21 by bolted joints (not shown in FIG. 4*c*) arranged in the set of through-going bolt holes 31, 41 of the wear lining element 22 and the helical screw flight 21, which through-going bolt holes 31, 41 are aligned when guide pins 22 are received within the guide holes 42.

Figure 5A:
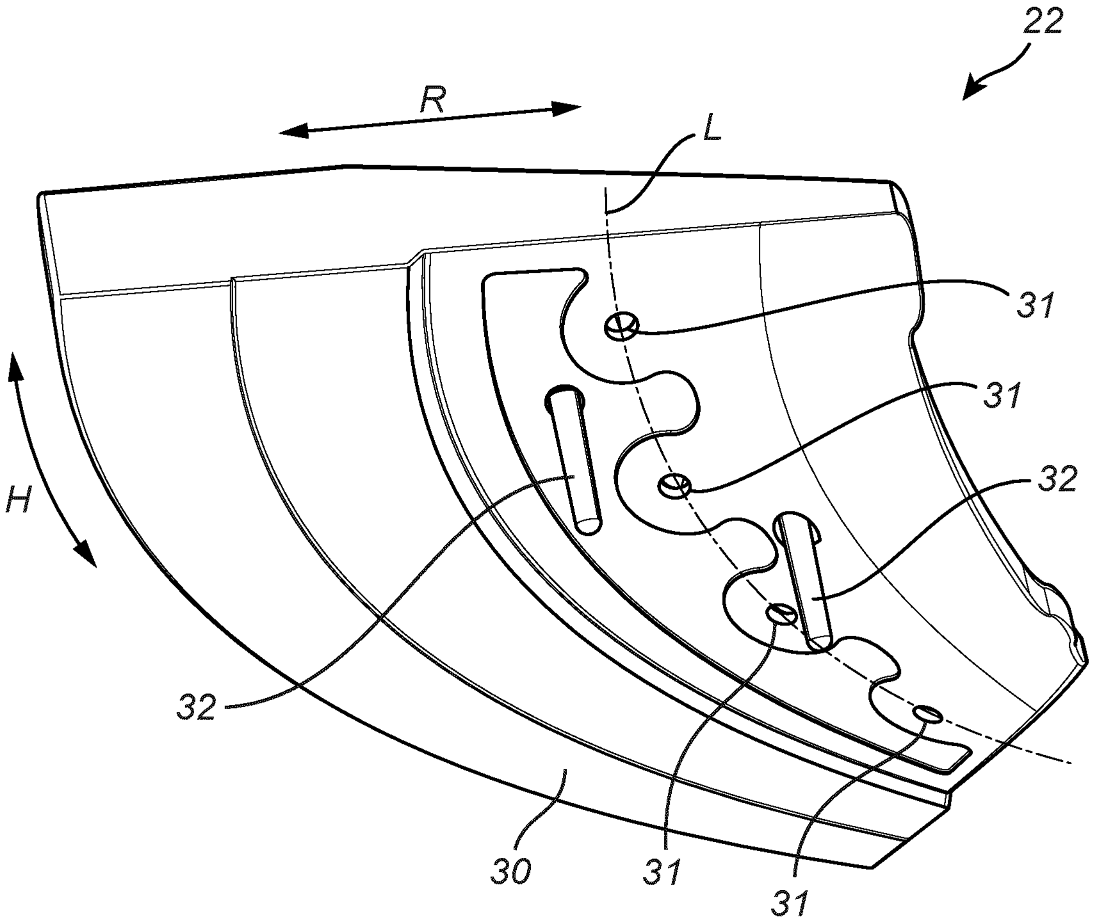
FIG. 5*a* is a perspective view of a wear lining element according to another embodiment of the disclosure.
Figure 5B:
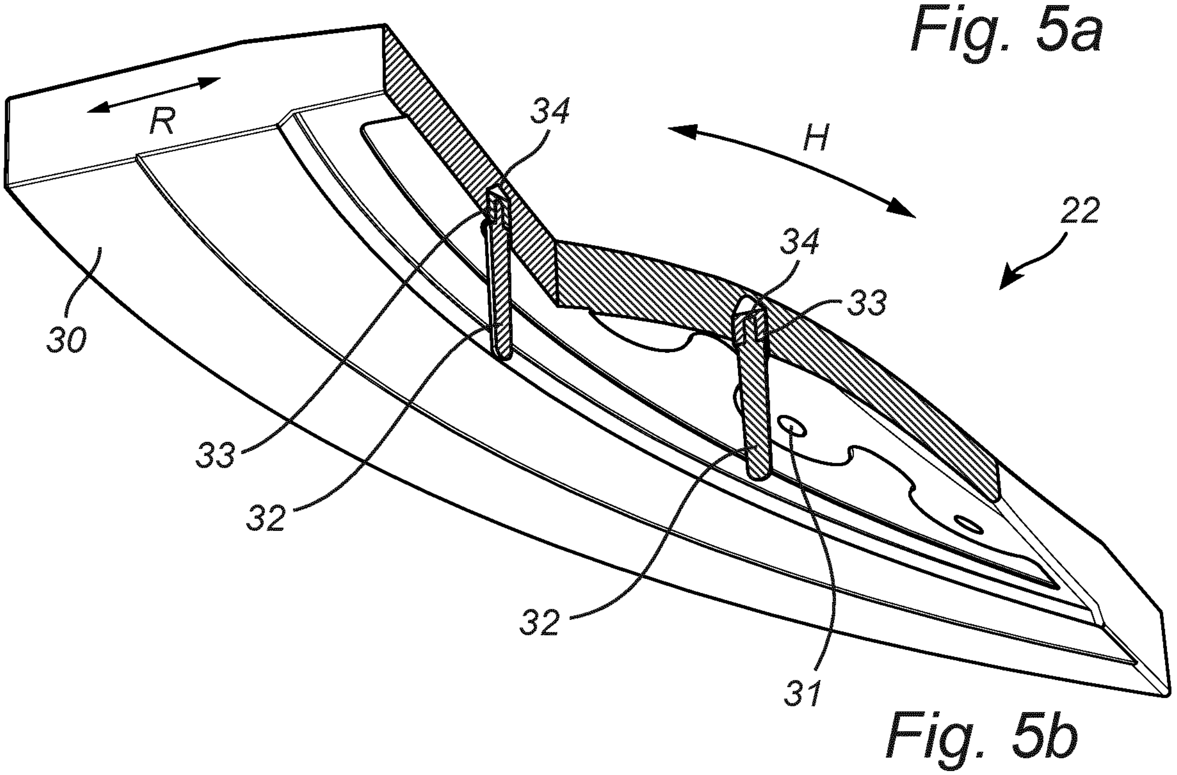
FIG. 5*b* is a cross-sectional view of the wear lining element in FIG. 5*a*.

FIGS. 5*a-d* show a screw flight system according to further embodiment of the disclosure. As seen in FIG. 5*a*, two guide pins 32 are arranged radially displaced on opposite sides of the set of through-going bolt 31 holes along the first line L. Further in this embodiment, the two guide pins 32 are displaced along the helical extension H of the wear lining element 22. As seen in FIG. 5*b*, inserts 33 are arranged in recesses 34 on the first side 30 of the wear lining element 22, and the guide pins 32 are engaging the inserts by threading.

Figure 5C:
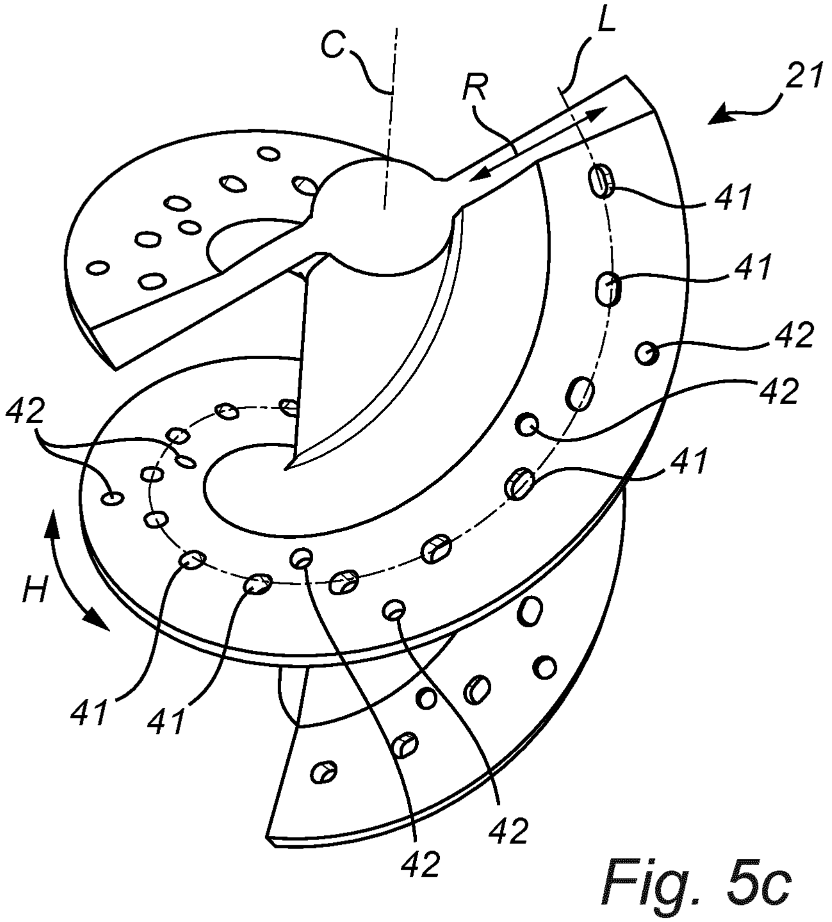
FIG. 5*c* is a perspective view of a helical screw flight according to another embodiment of the disclosure.

In FIG. 5*c*, the helical screw flight 21 is shown for the wear lining element 22 of FIGS. 5*a* and 5*b*. This helical screw flight 21 has guide holes 42 radially displaced in view of the set of through-going bolt holes 41 along a first line L. In this embodiment a set of two guide holes 42 are arranged on opposite sides of the first line L and displaced along the helical extension H of the helical screw flight 21. Such sets of guide holes 42 are arranged at predetermined distances along the helical extension H of the helical screw flight 21, which distances coincide with the positioning of the two guide pins 32 on the wear lining elements 22 and the helical extension H of the wear lining elements 22.

Figure 5D:
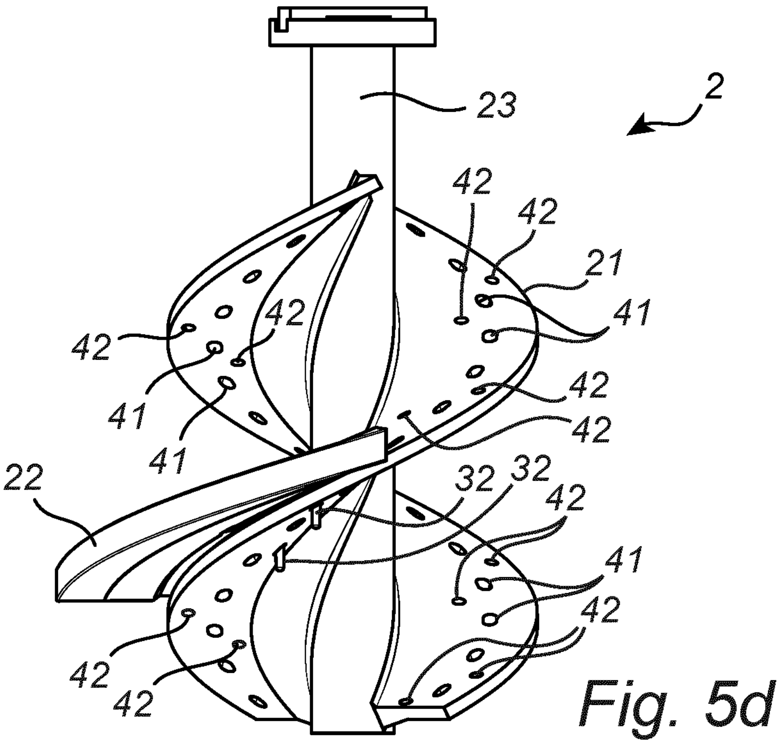
FIG. 5*d* is a perspective view of a screw flight system in which the wear lining element of FIGS. 5*a* and *b* is mounted to the helical screw flight of FIG. 5*c*.

In FIG. 5*d* the wear lining element 22 has been arranged on the helical screw flight by lifting the wear lining element 22 and aligning the guide pins 32 with a complementary guide holes 42 arranged in the helical screw flight and lowering the wear lining element 22 onto the helical screw flight 21. After having the wear lining element positioned in place, the wear lining element 22 is fastened to the helical screw flight 21 by bolted joints (not shown in FIG. 5*d*) arranged in the set of through-going bolt holes 31, 41 of the wear lining element 22 and the helical screw flight 21, which through-going bolt holes 31, 41 are aligned when guide pins 22 are received within the guide holes 42.

Figure 6A:
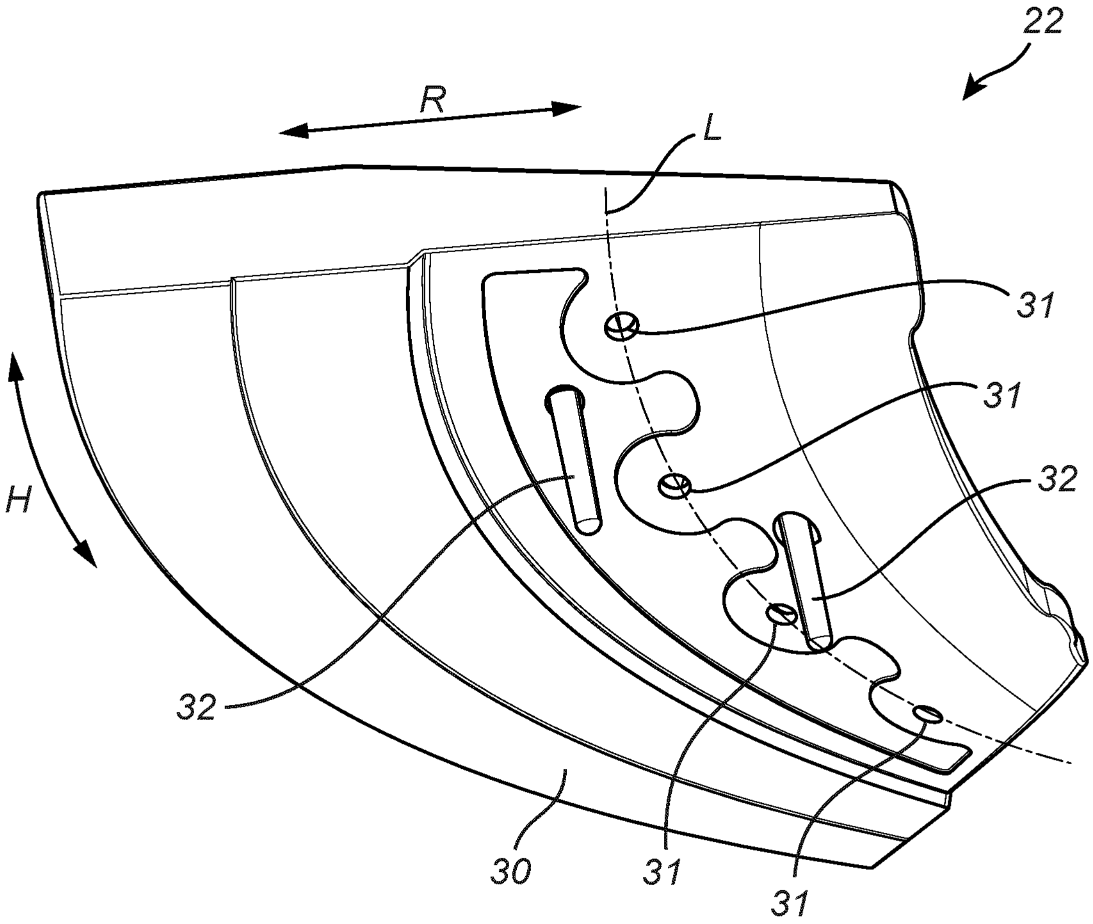
FIG. 6*a* is a perspective view of a wear lining element according to another embodiment of the disclosure.
Figure 6B:
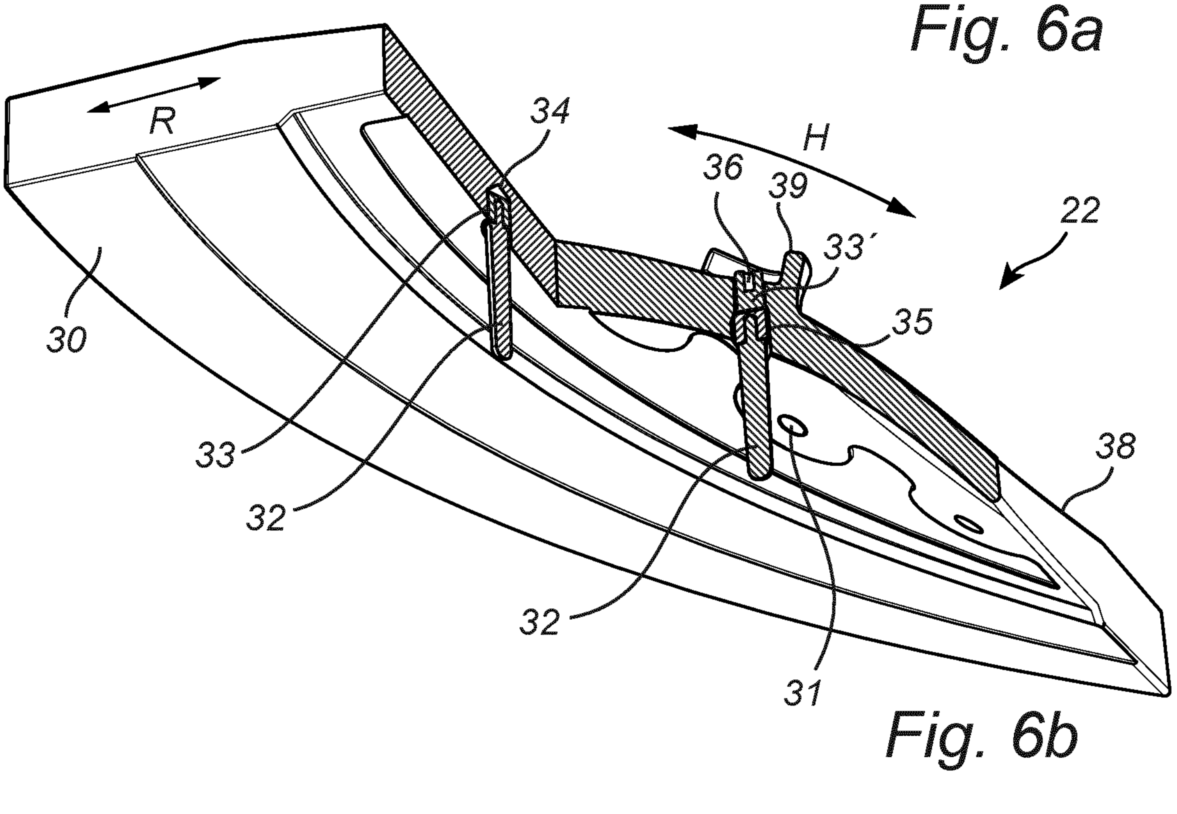
FIG. 6*b* is a cross-sectional view of the wear lining element in FIG. 6*a*.
Figure 6C:
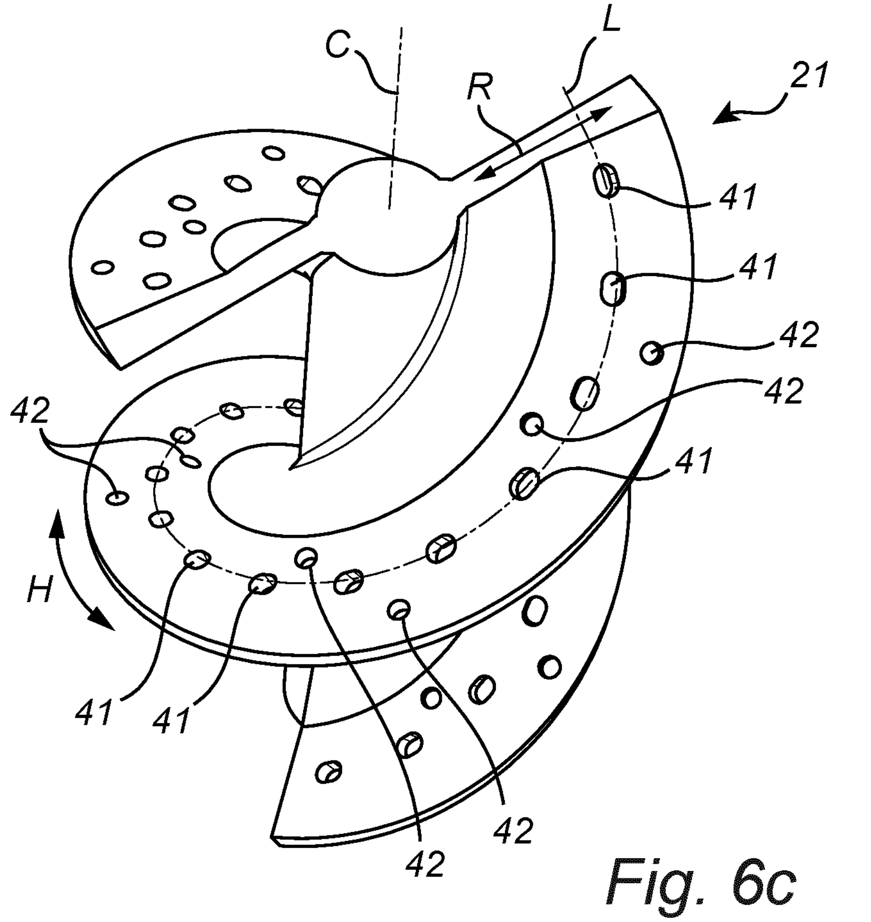
FIG. 6*c* is a perspective view of a helical screw flight according to another embodiment of the disclosure.
Figure 6D:
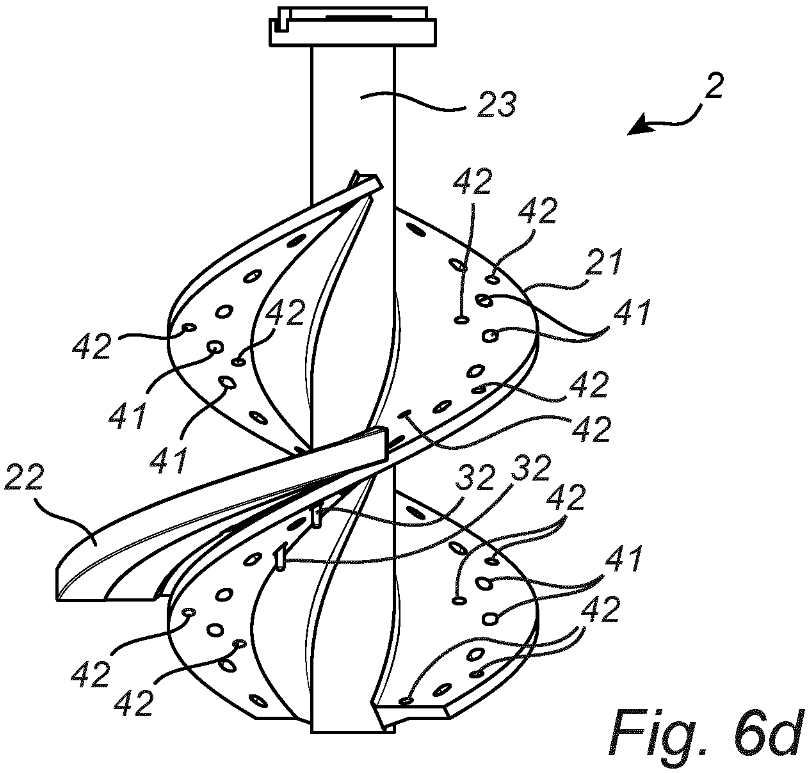
FIG. 6*d* is a perspective view of a screw flight system in which the wear lining element of FIGS. 6*a* and *b* is mounted to the helical screw flight of FIG. 6*c*.
Figure 6E:
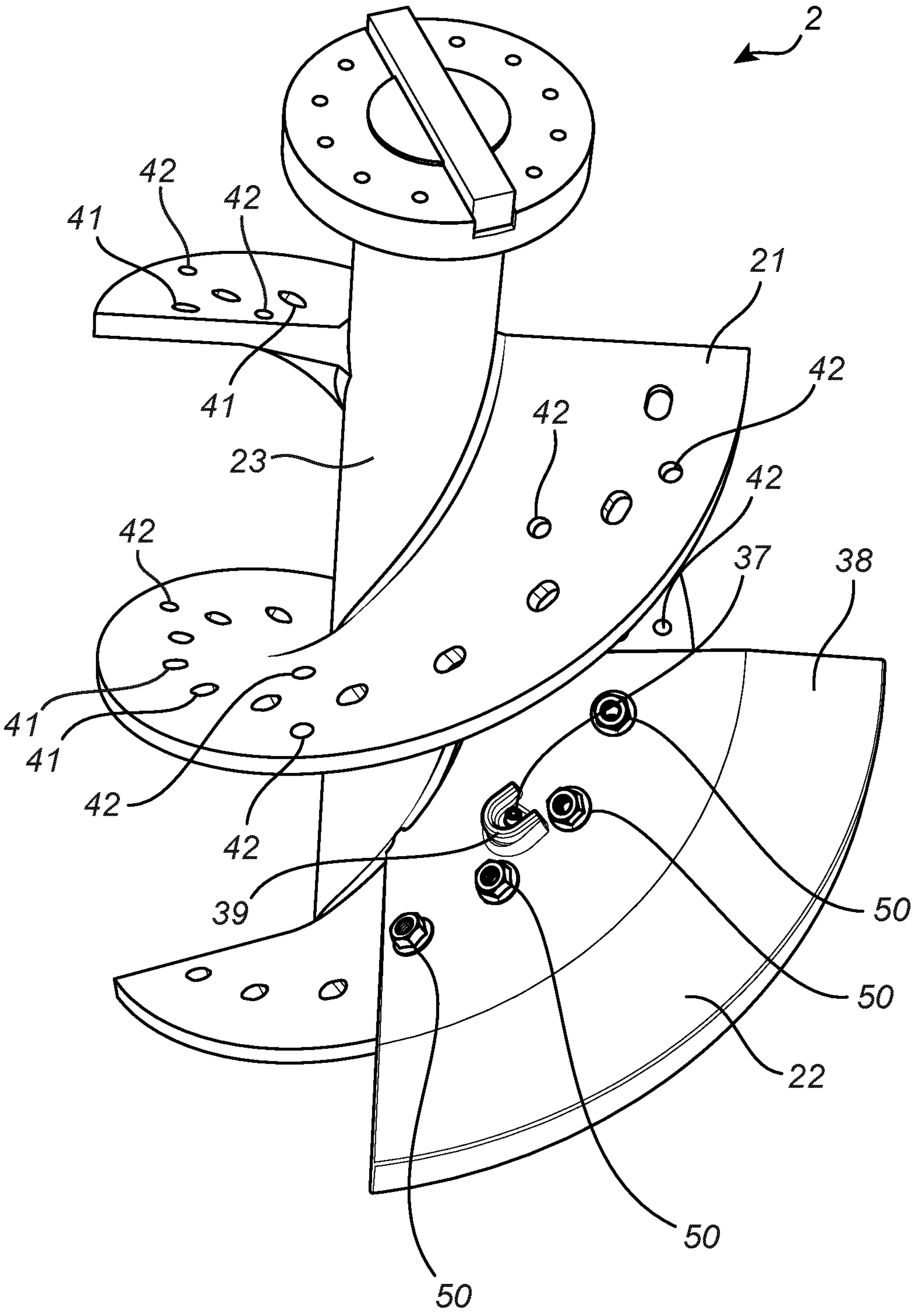
FIG. 6*e* is another perspective view of the screw flight system of FIG. 6*d*.
Figure 8A:
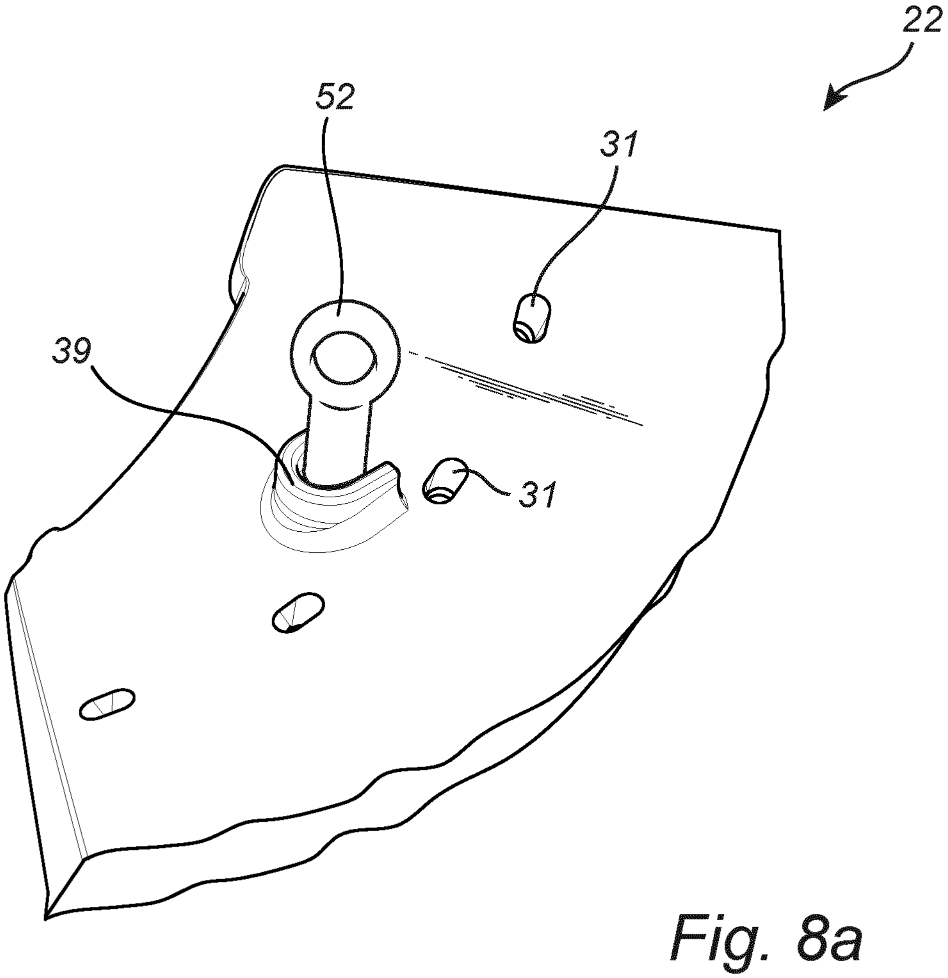
FIG. 8*a* is a perspective view of a worn wear lining element according to one embodiment of the present disclosure.

FIG. 6*a*-*e* show a screw flight system according to further embodiment of the disclosure. As seen in FIG. 6*a*, two guide pins 32 are arranged radially displaced on opposite sides of the set of through-going bolt 31 holes along the first line L. Like the embodiment in FIG. 5*a*-*d*, the two guide pins 32 are also here displaced along the helical extension H of the wear lining element 22. However as seen in FIG. 6*b*, one insert 33 is arranged in a recess 34 on the first side 30 of the wear lining element 22 like in the embodiments above, while the second insert 33' is arranged in a through-going channel 35. The guide pins 32 are engage with the first and second inserts 33, 33' by threading. The second insert 33' further comprises a bore 36 arranged for receiving and engaging a lifting lug 52 (as shown in FIG. 8*a*) or a protecting plug 37 (as shown in FIG. 6*e*). This bore 36 is accessed from a second surface 38 of the wear lining element 22, which second surface is configured to face away from the helical screw flight. In this embodiment the wear lining element 22 further comprises, on the second surface 38, a protrusion 39 that at least partly surrounds the through-going channel 35 and the bore 36 of the second insert 33'. The protrusion 39 is, in this embodiment, arranged to at least party surrounding the bore 36 as seen along a leading edge of the wear lining element 22. During operation, this protrusion 39 will at least to some extent protect the protecting plug. When the wear lining element 22 is worn out, the bore 36 may be used for receiving and engaging a lifting lug, to enable a lifting point to hoist the wear lining element 22 from the helical screw flight and out from the grinding chamber 3. The positioning of this bore 36 is aligned with an estimated centre of gravity of a worn wear lining element 22.

In FIG. 6*c*, the helical screw flight 21 is shown for the wear lining element of FIGS. 6*a* and 6*b*. This helical screw flight 21 has guide holes 42 radially displaced in view of the set of through-going bolt holes 41 along a first line L, and like the embodiment of FIG. 5*a*-*d* a set of two guide holes 42 are arranged on opposite sides of the first line L, and the two guide holes 42 are displaced along the helical extension H of the helical screw flight 21. Such sets of guide holes 42 are arranged at predetermined distances along the helical extension H of the helical screw flight 21, which distances coincide with the positioning of the two guide pins 32 on the wear lining elements 22 and the helical extension H of the wear lining elements 22.

In FIG. 6*d*, the wear lining element 22 has been arranged on the helical screw flight by lifting the wear lining element 22 and aligning the guide pins 32 with a complementary guide holes 42 arranged in the helical screw flight 21 and lowering the wear lining element 22 onto the helical screw flight 21. After having the wear lining element positioned in place, the wear lining element 22 is fastened to the helical screw flight 21 by bolted joints (not shown in FIG. 6*d*, but in FIG. 6*e*) arranged in the set of through-going bolt holes 31, 41 of the wear lining element 22 and the helical screw flight 21, which through-going bolt holes 31, 41 are aligned when guide pins 22 are received within the guide holes 42.

In FIG. 6*e*, the screw flight system of FIG. 6*d* is shown from a different perspective view, showing the second surface 38 of the wear lining element 22. Here the protrusion 39 is shown more clearly and especially how the protrusion 39 partly surrounds the bore 36 and the therein arranged protecting plug 37 as seen along a leading edge of the wear lining element 22. In FIG. 6*e*, the wear lining element 22 is fastened to the helical screw flight 21 by bolted joints 50.

The guide pins 32 disclosed above, are all arranged to be removable from the wear lining element 22, especially as the guide pins 32 are threadedly arranged on the wear lining element. As such, the guide pins 32 may be removed from the wear lining elements 22 as soon as the wear lining elements 22 have been fastened to the helical screw flight with fastening means, such as a bolted joint 50. However, the guide pins 32 may also be allowed to stay on, as the guide pins 32 will wear down under operation of the vertical grinding mill and will have no impact on the grinding operation.

Figure 7:
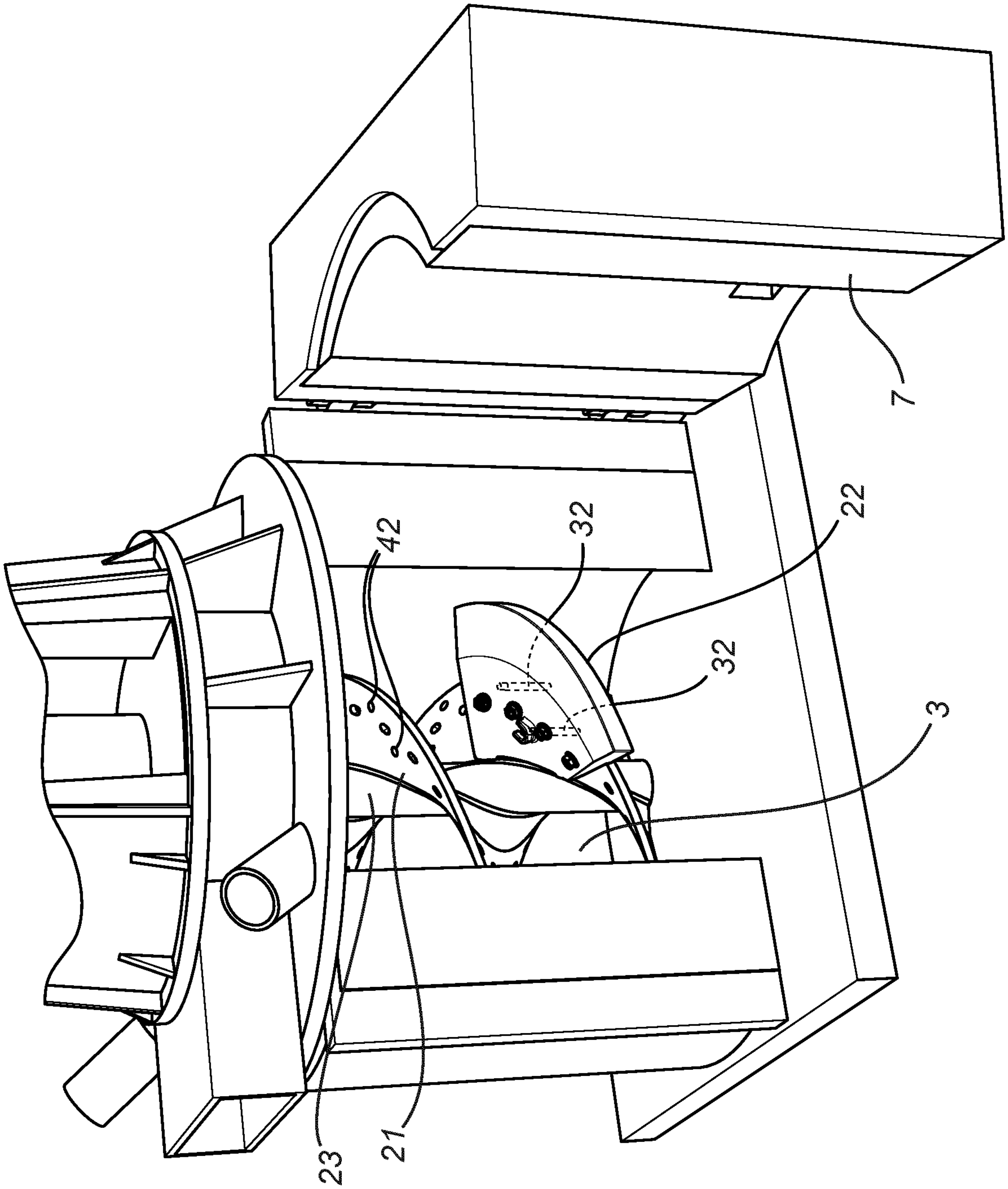
FIG. 7 is a perspective view of a vertical grinding mill, in which a replacement wear lining element according to the present disclosure has been mounted to the helical screw flight within the vertical grinding mill.

FIG. 7 shows the grinding chamber 3 of a vertical grinding mill 1, and the therein arranged agitator 2, with the shaft 23, helical screw flight 21 and one wear lining element 22 positioned in place upon the helical screw flight.

As seen in FIG. 7, the space is limited for the mounting and removal of the wear lining elements 22, and it is important that this mounting and removal is made in an efficient and time saving manner. The present disclosure provides such a solution.

FIGS. 3*a*-*b*, 4*a*, 5*a*-*b*, and 6*a*-*b* all show different embodiments of a replacement kit of wear lining elements according to this disclosure.

As disclosed above for the embodiment in FIGS. 6*a*-*e*, the bore 36 may receive a lifting lug for removal of a worn wear lining element 22 from the screw flight system 2. In FIG. 8*a* such a lifting lug 52 is illustrated arranged in the bore 36 of a worn wear lining element 22. When the wear lining element is worn out, the position of the bore 36 and the therein received lifting lug 52 is estimated to be in the centre of gravity of the worn wear lining element 22.

Figure 8B:
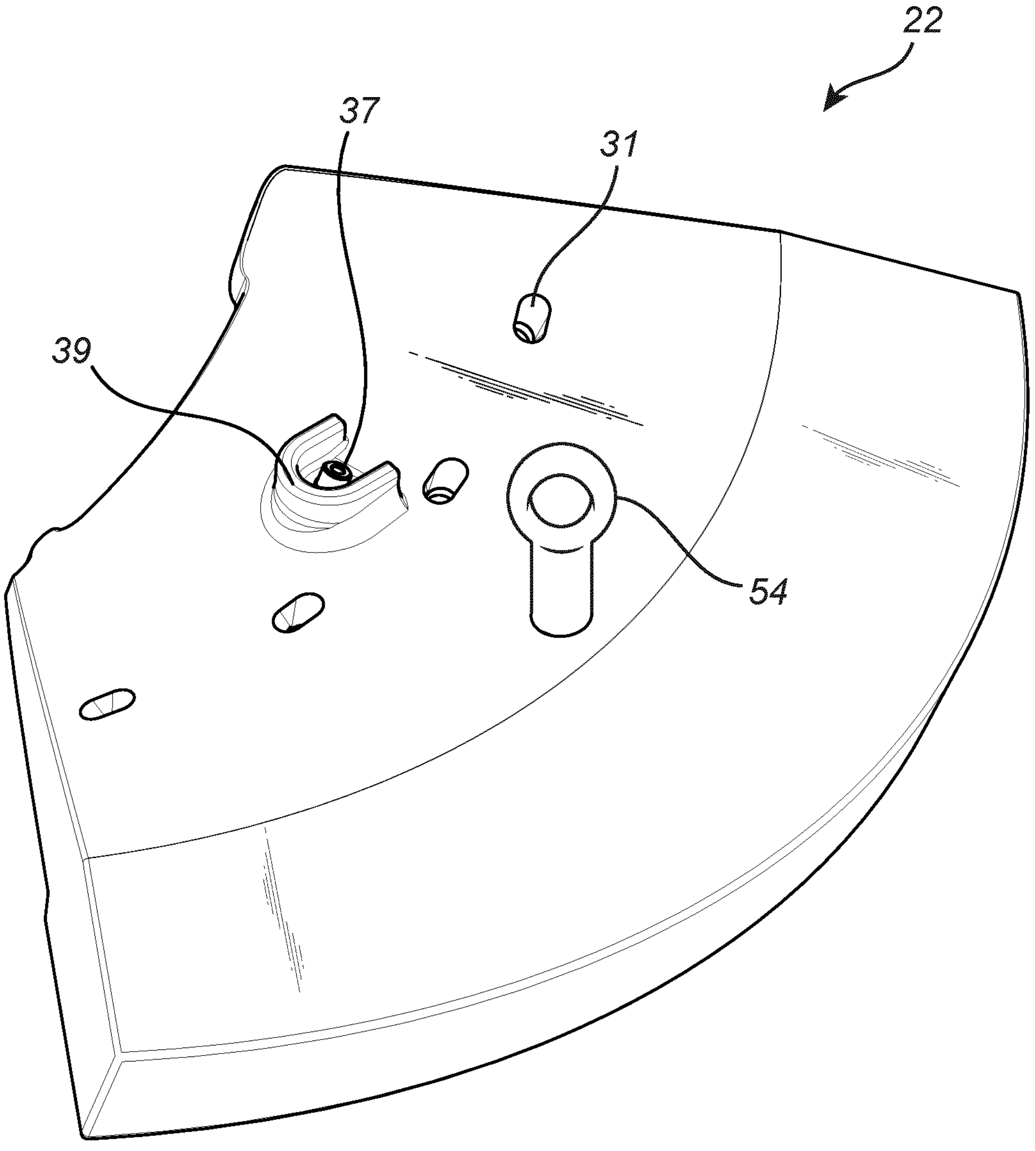
FIG. 8*b* is a perspective view of a replacement wear lining element according to one embodiment of the present disclosure.

A new wear lining element 22, which is to replace a worn wear lining element 22, has another centre of gravity, and as illustrated in FIG. 8*b*, another lifting lug 54 may be arranged in the wear lining element for the lifting a new wear lining element 22 into position with the aid of the guiding system according to the present disclosure. Other lifting devices may also be used for new non-worn wear lining elements 22, as for example the device disclosed in AU2014201893.

Figure 9:
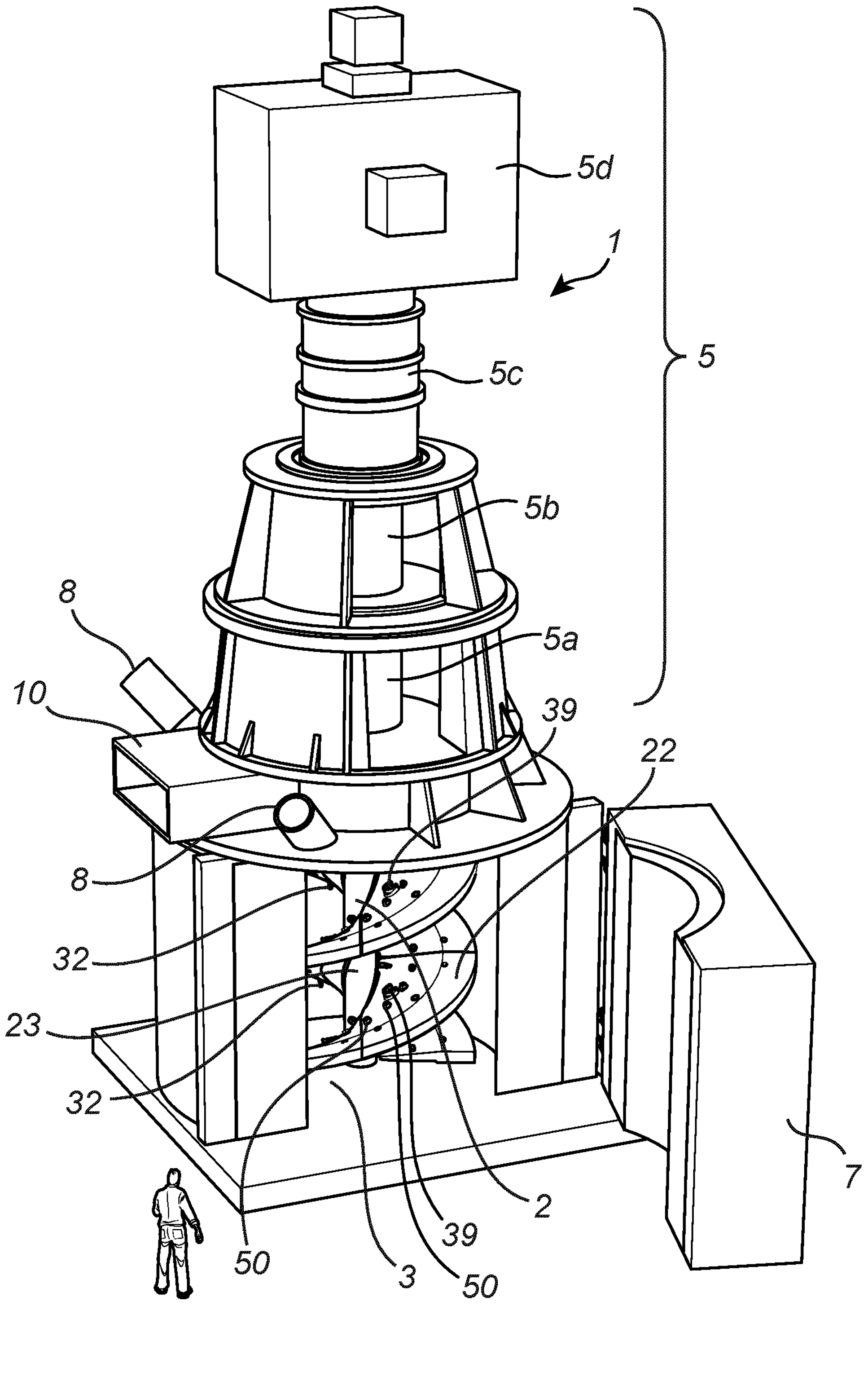
FIG. 9 is a perspective view of a vertical grinding mill according to the present disclosure in which the screw flight system is used.

In FIG. 9 a vertical grinding mill 1 according to one aspect of the invention is shown. In the vertical grinding mill 1, the screw flight system (2) as disclosed above is used. As seen in FIG. 9, wear lining elements 22 are position and fastened with bolted joints 50 to the helical screw flight 21 to form the agitator 2 within the grinding chamber 3. As seen in FIG. 9, the guide pins 32 are left attached to the wear lining elements 22 after fastening the bolted joints 50, but may also, as disclosed above, be removed before starting up the vertical grinding mill 1 for grinding operation.

The skilled person in the art realizes that the present disclosure by no means is limited to the preferred embodiments described above. On the contrary, many modifications and variations are possible within the scope of the appended claims.

For example, the through-going bolt holes 31, 41 in the wear lining element and the helical screw flight do not need to be arranged along a first line L with a uniform radial position along the helical extension of the wear lining element and the helical screw flight. The through-going bolt holes may be arranged to be radially displaced in relation to each other, e.g. two radially displaced rows along the helical extensions thereof.

Further, in the embodiments shown above, the guide pins 32 are arranged on the wear lining element 22, while the guide holes 42 are arranged in the helical screw flight 21. However, the opposite is also applicable. Thus, the guide pins 32 may be arranged on the helical screw flight 21 and the guide holes 42 may be arranged in the wear lining elements 22.

Additionally, variations to the disclosed embodiments can be understood and effected by the skilled person in practicing the claimed disclosure, from study of the drawings, the disclosure and the appended claims.

Below different items of the application is disclosed:

Item 1. A screw flight system (2) comprising a helical screw flight (21), and at least one wear lining element (22), wherein the screw flight system (2) further comprises a guiding system comprising at least one guide pin (32) adapted to be arranged on one of the helical screw flight (21) and the at least one wear lining element (22), and at least one guide hole (42) arranged on the other of the helical screw flight (21) and the at least one wear lining element (22), the at least one guide hole (42) being adapted to receive the at least one guide pin (32).

Item 2. A screw flight system (2) according to item 1, wherein the helical screw flight (21) and the at least one wear lining element (22) have a set of through-going bolt holes (31, 41), which through-going bolt holes (31, 41) are arranged along a first line (L), and wherein the at least one guide pin (32) and the at least one guide hole (42) are radially displaced in view of the first line (L).

Item 3. A screw flight system (2) according to item 1 or item 2, wherein the guiding system comprises at least two guide pins (32) and at least two guide holes (42) and that the at least two guide pins (32) and the at least two guide holes (42) are arranged on opposite sides of the first line (L).

Item 4. A screw flight system (2) according to item 3, wherein the at least two guide pins (32) and the at least two guide holes (42) are displaced along the helical extension (H) of the helical screw flight (21) and the at least one wear lining element (22).

Item 5. A screw flight system (2) according to any one of items 1-4, wherein the at least one guide pin (32) is arranged to be removable on one of the helical screw flight (21) and the wear lining elements (22).

Item 6. A screw flight system (2) according to any one of items 1-5, wherein the at least one guide pin (32) is adapted to be arranged on the at least one wear lining element (22), and the at least one guide hole (42) is arranged on the helical screw flight (21).

Item 7. A screw flight system (2) according to item 6, wherein the at least one wear lining element (22) comprises at least one insert (33, 33'), and wherein the at least one guide pin (32) is arranged to engage the at least one insert (33, 33') by threading.

Item 8. A screw flight system (2) according to item 7, wherein the at least one insert (33') is arranged in a through-going channel (35), and wherein the at least one insert (33') further comprises a bore (36) arranged for receiving and engaging a lifting lug or a protecting plug (37).

Item 9. A screw flight system (2) according to item 8, wherein the at least one wear lining element (22), on a surface (38) adapted to face away from the helical screw flight (21), comprises a protrusion (39) at least partly surrounding the bore (36).

Item 10. A screw flight system (2) according to item 9, wherein the protrusion (39) at least partly surrounding the bore (36) as seen along a leading edge of the at least one wear lining element (22).

Item 11. A vertical grinding mill (1), wherein the vertical grinding mill (1) comprising a screw flight system according to any one of items 1-10.

Item 12. A replacement kit of wear lining elements (22) for a screw flight system (2) in a vertical grinding mill (1), wherein the replacement kit comprises a wear lining element (22) and at least two guide pins (32) adapted to be arranged on the wear lining element (22).

Item 13. A replacement kit of wear lining elements (22) according to item 12, wherein the wear lining element (22) has a set of through-going bolt holes (31), which are arranged along a first line (L), and wherein the at least two guide pins (32) are adapted to be arranged radially displaced on opposite sides of the first line (L).

Item 14. A replacement kit of wear lining elements (22) according to item 12 or item 13, wherein the at least two guide pins (32) are displaced along the helical extension (H) of the wear lining element (22).

Item 15. A replacement kit of wear lining elements (22) according to any one of items 12-14, wherein the wear lining element (22) comprises at least two inserts (33, 33'), and wherein the at least two guide pins (32) are arranged to engage the at least two inserts (33, 33') by threading.

Item 16. A replacement kit of wear lining elements (22) according to any one of items 12-15, wherein at least one insert (33') is arranged in a through-going channel (35), and wherein the at least one insert (33') further comprises a bore (36) arranged for receiving and engaging a lifting lug or a protecting plug (37).

Item 17. A replacement kit of wear lining elements (22) according to item 16, wherein the wear lining element (22) comprises a protrusion (39) at least partly surrounding the bore (36) as seen along a leading edge of the wear lining element (22).

The invention claimed is:

1. A screw flight system comprising a helical screw flight, and at least one wear lining element, wherein the screw flight system further comprises a guiding system comprising:

at least one guide pin configured to be arranged on one of the helical screw flight and the at least one wear lining element, and at least one guide hole arranged on the other of the helical screw flight and the at least one wear lining element, the at least one guide hole being configured to receive the at least one guide pin, wherein the at least one guide pin is configured to be arranged on the at least one wear lining element, and the at least one guide hole is arranged on the helical screw flight, wherein the at least one wear lining element comprises at least one insert, wherein the at least one guide pin is arranged to engage the at least one insert by threading, wherein the at least one insert is arranged in a through-going channel, and wherein the at least one insert further comprises a bore arranged for receiving and engaging a lifting lug or a protecting plug.

2. The screw flight system according to claim 1, wherein the helical screw flight and the at least one wear lining element have a set of through-going bolt holes, which through-going bolt holes are arranged along a first line, and wherein the at least one guide pin and the at least one guide hole are radially displaced in view of the first line.

3. The screw flight system according to claim 2, wherein the guiding system comprises at least two guide pins and at least two guide holes and that the at least two guide pins and the at least two guide holes are arranged on opposite sides of the first line.

4. The screw flight system according to claim 3, wherein the at least two guide pins and the at least two guide holes are displaced along the helical extension of the helical screw flight and the at least one wear lining element.

5. The screw flight system according to claim 1, wherein the at least one guide pin is arranged to be removable on one of the helical screw flight and the wear lining elements.

6. The screw flight system according to claim 1, wherein the at least one wear lining element, on a surface configured to face away from the helical screw flight, comprises a protrusion at least partly surrounding the bore.

7. The screw flight system according to claim 6, wherein the protrusion at least partly surrounding the bore as seen along a leading edge of the at least one wear lining element.

8. A vertical grinding mill, wherein the vertical grinding mill comprising a screw flight system according to claim 1.

* * * * *